US00RE36246E

United States Patent [19]

Nakano et al.

[11] E Patent Number: Re. 36,246

[45] Reissued Date of Patent: Jul. 6, 1999

[54] FILM REWINDER

[75] Inventors: Yoshiyuki Nakano, Tokyo; Mikio Takemae, Yokohama, both of Japan

[73] Assignee: Nikon Corporation, Tokyo, Japan

[21] Appl. No.: 08/733,991

[22] Filed: Oct. 18, 1996

Related U.S. Patent Documents

Reissue of:

[64] Patent No.: 4,707,095
Issued: Nov. 17, 1987
Appl. No.: 08/846,944
Filed: Apr. 1, 1986

U.S. Applications:

[63] Continuation of application No. 08/434,123, May 2, 1995, abandoned, which is a continuation of application No. 08/094,357, Jul. 21, 1993, abandoned, which is a continuation of application No. 07/785,214, Oct. 28, 1991, abandoned, which is a continuation of application No. 07/593,465, Oct. 3, 1990, abandoned, which is a continuation of application No. 07/370,589, Jun. 21, 1989, abandoned.

[51] Int. Cl.[6] ..... G03B 1/00

[52] U.S. Cl. ..... 396/390; 396/409; 396/410

[58] Field of Search ..... 396/404, 405, 396/409, 410, 390, 392

[56] References Cited

U.S. PATENT DOCUMENTS

| | | | |
|---|---|---|---|
| Re. 33,436 | 11/1990 | Araki et al. | 354/214 X |
| 4,304,480 | 12/1981 | Fukahori et al. | 354/214 X |
| 4,311,377 | 1/1982 | Matteson | 354/217 |
| 4,324,469 | 4/1982 | Harvey | 354/214 |
| 4,400,074 | 8/1983 | Akiyama et al. | 354/214 X |
| 4,506,965 | 3/1985 | Kitajima et al. | 354/214 X |
| 4,572,636 | 2/1986 | Konno | 354/214 X |
| 4,849,779 | 7/1989 | Yamamoto et al. | 354/173.11 |
| 5,032,858 | 7/1991 | Kobayashi et al. | 354/214 X |

FOREIGN PATENT DOCUMENTS

| | | | |
|---|---|---|---|
| 57-211131 | 12/1982 | Japan | 354/173.11 |
| 60-74016 | 4/1985 | Japan . | |

*Primary Examiner*—W. B. Perkey
*Attorney, Agent, or Firm*—Shapiro and Shapiro

[57] ABSTRACT

A film rewinder for a camera comprising a motor and rewinding means driven by the motor and adapted to rewind a used film into a film cartridge, comprises first sensing means disposed at a specific position in the path of the film moved to the film cartridge when the film is being rewound and effective to generate an output signal when the leader portion of the film has passed the specific position; second sensing means effective to generate an output signal when the leader portion of the film is further rewound to the film cartridge beyond the specific position; means for selecting one of first and second conditions; and control means. The control means is used for de-energizing the motor when the first condition is selected by the selecting means and if the control means receives the output signal from the first sensing means and for de-energizing the motor when the second condition is selected by the selecting means and if the control means receives the output signal from the second sensing means.

13 Claims, 7 Drawing Sheets

FILM REWINDER

Matter enclosed in heavy brackets [ ] appears in the original patent but forms no part of this reissue specification; matter printed in italics indicates the additions made by reissue.

*This is a continuation of reissue application Ser. No. 08/434,123 filed May 2, 1995, which is a continuation of reissue application Ser. No. 08/094,357 filed Jul. 21, 1993, which is a continuation of reissue application Ser. No. 07/785,214 filed Oct. 28, 1991, which is a continuation of reissue application Ser. No. 07/593,465 filed Oct. 3, 1990, which is a continuation of reissue application Ser. No. 07/370,589 filed Jun. 21, 1989, all now abandoned.*

BACKGROUND OF THE INVENTION

1. Field of the Invention

The present invention relates to an apparatus for automatically stopping a camera film rewinder which is driven by a motor.

2. Related Background Art

There are known two types of such film rewinders, the first one of which is automatically stopped when a film is rewound with some part of its leader or tongue portion remaining outside of a film cartridge. The second type of film rewinder is automatically stopped when an entire film has completely been rewound in a film cartridge.

In the first type of film rewinder, the film can simply be removed from the film cartridge for development since the tongue of the film is outside of the film cartridge. However, the external tongue of the film confuses a user with respect to whether or not that film has been used.

The second type of film rewinder is advantageous in that a used film can be confirmed since it has completely been rewound in the film cartridge. However, this raises a problem in that it is difficult to remove the film from the cartridge for development.

SUMMARY OF THE INVENTION

It is therefore an object of the present invention to overcome the above-mentioned problems in the prior art and to provide an apparatus for optionally selecting either of a mode in which an entire film is completely rewound in a film cartridge or a mode in which the film is rewound with its tongue remaining outside of the film cartridge.

To accomplish this object, the present invention is characterized in that one of two different signals generated respectively at different times during rewinding is selected for the desired mode.

DESCRIPTION OF PREFERRED EMBODIMENTS

Figure 1:
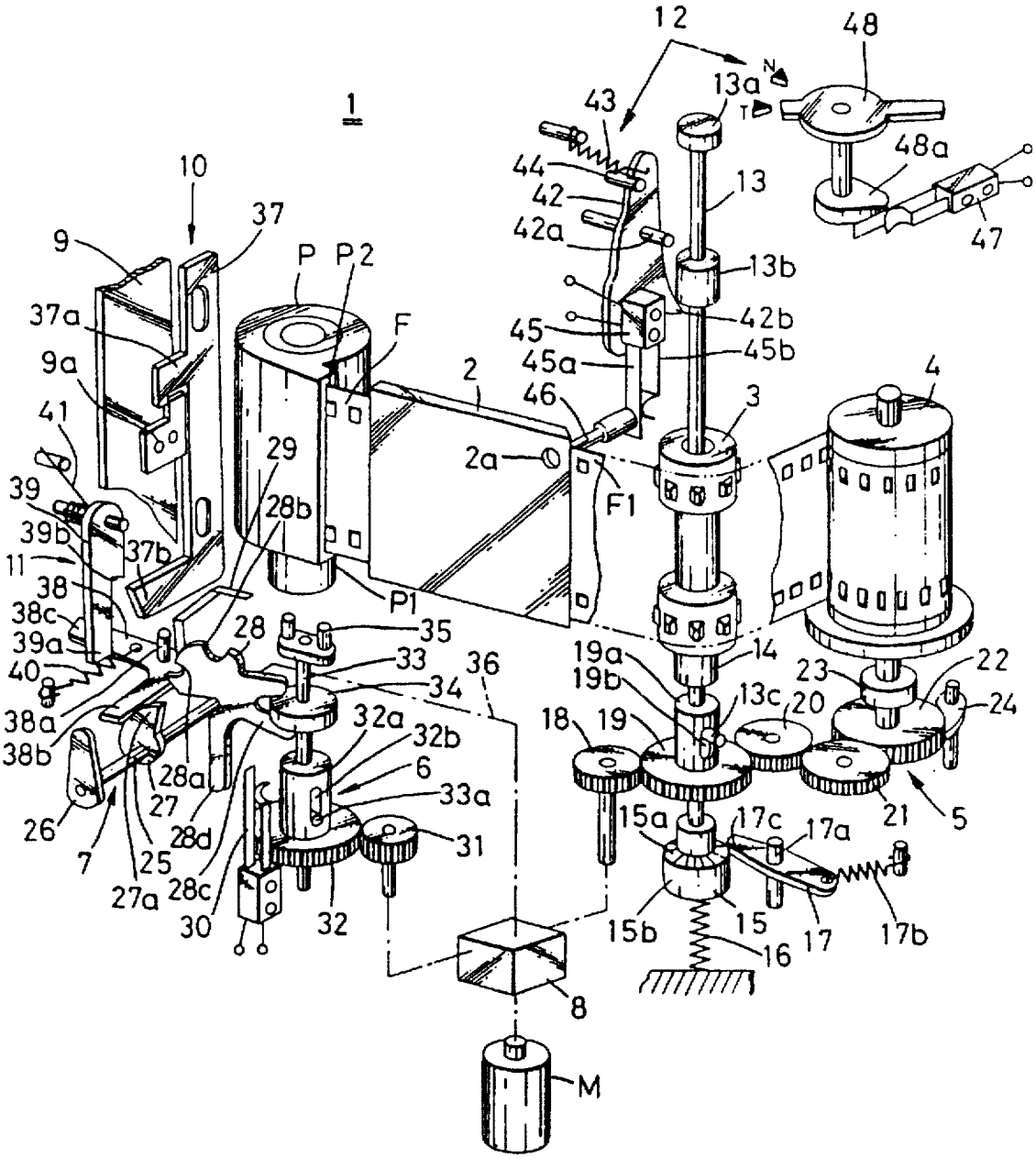
FIG. 1 is a perspective view of the internal detailed arrangement of a camera into which an automatic rewinder stopping system constructed according to a first embodiment of the present invention is incorporated.

Prior to the description of various embodiments according to the present invention, it is to be noted that similar reference numerals are used to denote similar parts throughout the drawings.

Referring first to FIG. 1, there is shown a first embodiment of the present invention in which a camera 1 comprises a pressure plate 2, a sprocket 3 and a spool 4 all of which are used to guide a film F from a film cartridge P loaded in the camera 1. The camera 1 also comprises a motor M, a film wind-up mechanism 5, a film rewind mechanism 6, a rewinder actuating section 7, a clutch mechanism 8 operatively associated with the rewinder actuating section 7 to change the transmission of a driving force from the motor M to the film wind-up mechanism 5 or to the film rewind mechanism 6, a mechanism 10 for opening and closing a back lid 9, a locking mechanism 11 and an automatic rewinder stopping apparatus 12.

The sprocket 3 is disposed about a sprocket shaft 13 and connected with it through a clutch 14. The connection between the sprocket 3 and the sprocket shaft 13 is accomplished by the clutch 14 when the sprocket shaft 13 is in its raised position shown in FIG. 1. When the sprocket shaft 13 is moved down from its illustrated position, the sprocket 3 is disconnected from the sprocket shaft 13. The top end of the sprocket shaft 13 is formed with a release button 13a extending outwardly from the camera 1. The sprocket shaft 13 also includes an enlarged portion 13b formed thereon below the release button 13a. The sprocket shaft 13 further includes a pin 13c on its lower portion and a release block 15 rigidly mounted on the bottom end of the sprocket shaft 13. The sprocket shaft 13 is biased upwardly under the action of a spring member 16 engaging the bottom end face of the sprocket shaft 13.

A shaft 17a rotatably supports a latch member 17 for engaging the top stepped face 15a of the release block 15 to prevent the upward movement of the sprocket shaft 13. The latch member 17 is biased by means of a spring member 17b such that the distal end 17c of the latch member 17 will normally engage the outer periphery 15b of the release block 15.

The film wind-up mechanism 5 functions to transmit the rotation of the motor M to the sprocket 3 and spool 4 through the clutch mechanism 8 and comprises a first gear 18, a sprocket gear 19, a second gear 20, a third gear 21 and a spool gear 22. The sprocket gear 19 is rotatably mounted about the sprocket shaft 13 and includes a sleeve 19a rigidly mounted thereon. The sleeve 19a is formed with a slot 19b through which the pin 13c extends outwardly. Thus, the sprocket shaft 13 is rotatable with the sprocket gear 19 and also movable vertically relative to the sprocket gear 19.

The spool gear 22 is connected with the spool 4 through a friction clutch 23 and prevented by an anti-reverse pawl 24 from rotating counter-clockwise.

The rewinder actuating section 7 comprises a rewind lever 26 rigidly mounted on a shaft 25 at one end and extending outside of the camera 1, a cam 27 rigidly mounted on the shaft 25 at its central portion between the opposite ends, a selector lever 28 rigidly supported by the opposite end of the shaft 25, a leaf spring 29 and a rewind switch 30. The rewind lever 26 is rotatable, with the cam 27 and selector lever 28, counter-clockwise between the illustrated home position and the rewind position. The leaf spring 29 is engageable in a groove 28a or 28b in the selector lever 28 to hold the rewind lever 26 at the home or rewind position. The cam 27 has a camming portion 27a and the selector lever 28 is formed with a fork-shaped portion 28c and an arm portion 28d. When the arm portion 28d is rotated counter-clockwise from its illustrated position, it is arranged to activate rewind switch 30.

The film rewind mechanism 6 is adapted to transmit the rotation of the motor M to the hub P1 of the cartridge P through the clutch mechanism 8 and comprises a first gear 31, a second gear 32, a rewind shaft 33 extending through the sleeve portion 32a of the second gear 32, a disk 34 rigidly mounted on the rewind shaft 33 and a fork-shaped portion 35. The sleeve portion 32a on the second gear 32 is formed with a slot 32b through which a pin 33a on the rewind shaft 33 extends outwardly. Therefore, the rewind shaft 33 is rotatable with the second gear 32 and also movable vertically relative to the second gear 32.

The disk 34 is interleaved between the blades of the fork-shaped portion 28c. Therefore, the fork-shaped portion 35 is vertically movable between its illustrated non-engagement position and its raised engagement position when the selector lever 28 is rotated. In its engagement position, the fork-shaped portion 35 will engage a key (not shown) on the cartridge hub P1.

When the rewind lever 26 is in its home position, the clutch mechanism 8 drivingly connects the first gear 18 of the film wind-up mechanism 5 with the motor M. The clutch mechanism 8 is connected with the selector lever 28 in the rewinder actuating section 7 such that the first gear 31 of the film rewind mechanism 6 will drivingly be connected with the motor M when the rewind lever 26 is in its rewind position.

The lid opening and closing mechanism 10 comprises a latch member 9a rigidly mounted on the back lid 9 and a manipulated member 37 manually operated from the outside of the camera 1 and including a portion 37a engaged by the latch member 9a. The manipulated member 37 is vertically movable between its closing position as illustrated and its opening position above the closing position.

The locking mechanism 11 comprises a swingable lever 38 and a lock member 39. The swingable lever 38 is biased counter-clockwise about a shaft 38a under the action of a spring member 40, and has an arm portion 38b engaging the camming portion 27a of the cam 27 under the influence of the spring member 40 and a latching portion 38c adapted to latch the lower end 39a of the lock member 39. The lock member 39 is biased counter-clockwise about its shaft under the action of a spring member 41 and formed with a step 39b adapted to engage the latched portion 37b of the manipulated member 37 when the lock member 39 is rotated counter-clockwise from its lock releasing position as illustrated.

A switch lever 42 is rotatably supported by a shaft 42a at a position adjacent to the sprocket shaft 13. The switch lever 42 is biased counter-clockwise under the action of a spring member 43 and held at its home position as illustrated by engagement with stop 44. The switch lever 42 also includes a projection 42b extending into the path of the enlarged portion 13b in the sprocket shaft 13.

A film sensing switch 45 is supported by the switch lever 42 and includes a contact piece 45a on which a sensing pin 46 is rigidly mounted at its proximal end. The sensing pin 46 is arranged such that when the switch lever 42 is rotated clockwise from its illustrated position, the distal end of the sensing pin 46 will be engaged by the upper edge F1 of the film F. When the leader portion of the film F has passed the sensing pin 46, the distal end of the sensing pin 46 is movable through an aperture 2a formed in the pressure plate 2. The film sensing switch 45 also includes another contact piece 45b so arranged that it is closed against the contact piece 45a when the (distal end of the sensing pin 46 is in engagement with the film F. After the film F has passed the sensing pin 46, which in turn penetrates into the aperture 2a in the pressure plate 2, the contact pieces 45a, 45b of the film sensing switch 45 are separated from each other to open the circuit. The sensing pin 46 and aperture 2a are spaced apart from the inlet slit P2 of the cartridge P by a distance larger than the length of the film F which is moved under inertia of the motor M after the latter has been de-energized.

A selector 48 is movable between position T in which a rewinding is automatically stopped with some portion of the leader of the film F remaining outside of the cartridge P and a position N in which the rewinding is automatically stopped after the film F including the leader portion has completely been rewound into the cartridge P. The selector 48 can manually be manipulated from the outside of the camera 1 and includes a cam 48a formed integrally thereon at the lower end. The cam 48a is adapted to open the switch 47 when the selector 48 is in the position T and to close the switch 47 if the selector 48 is in the position N.

Figure 2:
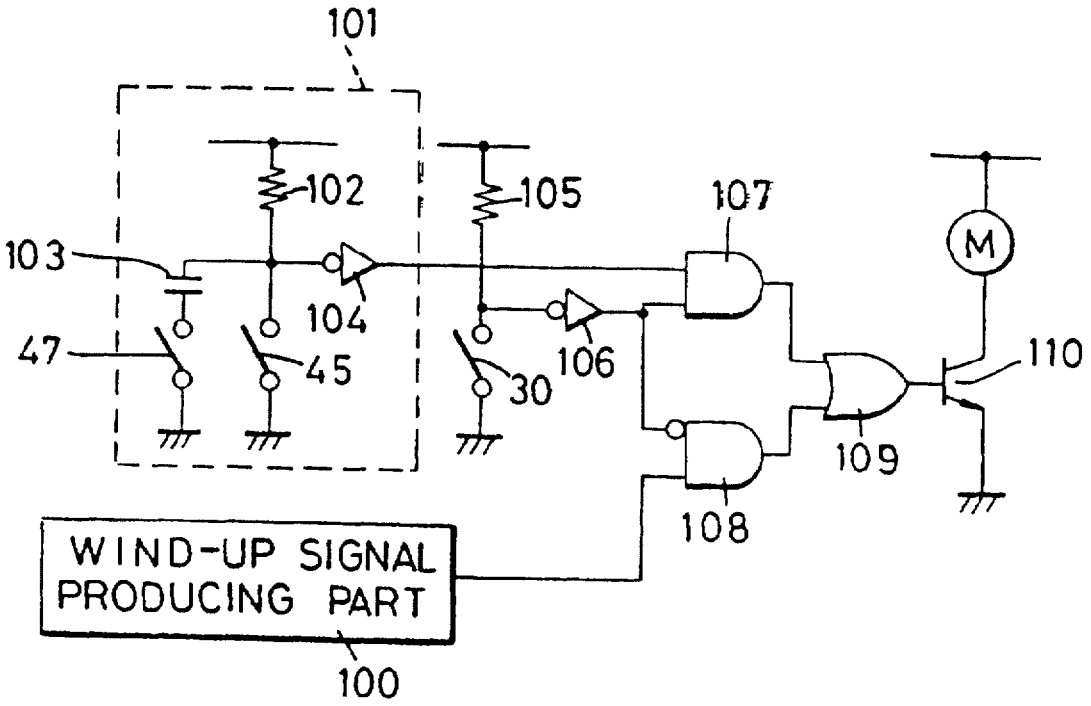
FIG. 2 is an electric circuit diagram of the arrangement shown in FIG. 1.

Referring now to FIG. 2, there is shown a wind-up signal producing part 100 the output of which can produce a wind-up signal in H level when a series of exposure control operations has been completed. The wind-up signal is then supplied to the input of an AND gate 108.

FIG. 2 also shows a rewind-stop signal producing part 101 the output of which can produce a rewind-stop signal in L level used to de-energize the motor M. The rewind-stop signal is applied to the input of an AND gate 107. The rewind-stop signal producing part 101 comprises said film sensing switch 45, a pull-up resistor 102 connected in series with the film sensing switch 45, said switch 47 and a capacitor 103 connected in series between a junction of the film sensing switch 45 with the pull-up resistor 102 and the ground, and an invertor 104 having its input terminal connected with said junction. The invertor 104 includes a Schmitt circuit and others (not shown) and is adapted to change the output from H to L if the voltage at said junction exceeds a predetermined level.

The rewind switch 30 is connected in series with a pull-up resistor 105. The junction between the rewind switch 30 and the pull-up resistor 105 is then connected with the input terminal of an invertor 106. The output terminal of the invertor 106 is connected with the respective input terminals of the AND gates 107 and 108. The input signal into the invertor 106 is inverted. The respective output terminals of the AND gates 107 and 108 are connected with the input terminal of an OR gate 109. The output terminal of the OR gate 109 is coupled with the base of a transistor 110. The transistor 110 has its collector coupled with said motor M and its emitter connected with the ground.

The pull-up resistor 102 and capacitor 103 form, a time constant circuit for establishing a period of time for which when the switch 47 is in its ON state, the output of the invertor 104 is inverted, that is, the rewind-stop signal of L level is supplied to the input of the AND gate 107 after the film sensing switch 45 has been turned off. The time constant circuit has a time constant established such that a rewind-stop signal can be applied to the input of the AND gate 107 when a length of the film from the inlet slit P2 of the cartridge P to the outermost end of the film leader portion becomes smaller than a distance through which the film F is moved under inertia of the motor M after the latter has been de-energized.

The system is operated in the following manner:

(1) Under the normal condition, the rewind lever 26 is in its home position as shown in FIG. 1 and the selector lever 28 causes the rewind switch 30 to be in its OFF state since the arm portion 28d of the selector lever 28 is in a position spaced away from the rewind switch 30. Therefore, a signal of L level is supplied from the invertor 106 to the inverted input terminal of the AND gate 108. The motor M is in connection with the first gear 18 of the film wind-up mechanism 5 through the clutch mechanism 8.

After a series of exposure control operations have been completed, the wind-up signal producing part 100 provides a wind-up signal of H level to the input of the AND gate 108. The output of the AND gate 108 in turn provides a signal of H level to the input of the OR gate 109 the output of which in turn provides a signal of H level to transistor 110. The transistor 110 is then turned on to energize the motor M. The rotation of the motor M is transmitted to the sprocket 3 through the clutch mechanism 8, first gear 18, sprocket gear 19, sprocket shaft 13 and clutch 14 and at the same time to the spool 4 through the second gear 20, third gear 21, spool gear 22 and friction clutch 23. Therefore, the spool 4 and sprocket 3 are driven to wind the film F about the spool 4. When the film F is wound up by a frame, the wind-up signal producing part 100 generates an output signal of L level used to de-energize the motor M.

(2) After all the frames of the film F have been used and when it is desired to rewind the film F, the release button 13a on the sprocket shaft 13 is depressed from its raised position shown in FIG. 1; the selector 48 is set in the desired position; and finally the rewind lever 26 is manually rotated counter-clockwise from its illustrated home position to its rewind position.

When the sprocket shaft 13 is depressed with the enlarged portion 13b thereof pressing the projection 42b on the switch lever 42, the latter is rotated clockwise about the shaft 42a against the action of the spring member 43. This rotation of the switch lever 42 urges the film sensing switch 45 and sensing pin 46 toward the film F. Since at this time, the film F is on the pressure plate 2, the distal end of the sensing pin 46 is engaged by the upper edge F1 of the film F to engage the contact pieces 45a and 45b with each other to close the film sensing switch 45.

When it is desired to select the mode wherein the rewinding is automatically stopped with some part of the leader portion of the film F remaining outside of the cartridge P, the selector 48 is shifted to the position T as shown in FIG. 1. The switch 47 is then turned off by means of the cam 48a on the selector 48.

When the rewind lever 26 is rotated counter-clockwise from its illustrated home position to its rewind position, the arm portion 38b on the swingable lever 38 is pressed by the camming portion 27a on the cam 27 such that the swingable lever 38 will be rotated clockwise from its illustrated position against the action of the spring member 40. The rotation of the lever 38 causes the lock member 39 to rotate counter-clockwise under the action of the spring member 41. As a result, the step 39b on the lock member 39 is engaged by the latched portion 37b of the manipulated member 37 such that the latched portion 37b will be locked at its closed position wherein the latch member 9a is latched and then the back lid 9 on the camera 1 cannot be opened externally.

When the rewind lever 26 is rotated counter-clockwise, the selector lever 28 also is rotated in the same direction so that the disk 34 is upwardly moved by the fork-shaped portion 28c and the rewind switch 30 is closed by the arm portion 28d At the same time, the fork-shaped portion 35c engages the cartridge hub P1. In association with the rotation of the rewind lever 26, the clutch mechanism 8 is engaged to connect the motor M with the first gear 31 in the film rewind mechanism 6 so that the rotation of the motor M can be transmitted to the cartridge hub P1. It is to be noted that the film sensing switch 45 is already in its ON state when the rewind switch 30 is turned on by the operation of the rewind lever 26. On closing of the rewind switch 30, therefore, a signal of L level is supplied to the input terminal of the inverter 106 the output of which in turn supplies signals of H level to the input terminal of the AND gate 107 and to the inverted input terminal of the AND gate 108, respectively. As a result, the AND gate 108 is closed. It is also to be noted that since the film sensing switch 45 is in its ON state, the input of the invertor 104 becomes L level and a signal of H level is supplied from the output of that invertor to the input of the AND gate 107. When the rewind switch 30 is turned on, therefore, the output of the AND gate 107 generates a signal of H level which in turn is supplied to the transistor 110 through the OR gate 109. Thus, the transistor 110 is turned on to energize the motor M.

The rotation of the motor M is transmitted to the hub P1 of the cartridge P through the clutch mechanism 8, first gear 31, second gear 32, rewind shaft 33 and fork-shaped portion 35 to initiate a rewinding of the film F into the cartridge P.

When the rewinding proceeds until the leader portion of the film F has passed the distal end of the sensing pin 46, the distal end of the sensing pin 46 penetrates into the aperture 2a in the pressure plate 2 under the biasing force of the contact piece 45a. Thus, the contact piece 45a becomes spaced away from the contact piece 45b to open the film sensing switch 45. As a result, a signal of H level is immediately supplied to the invertor 104 of the rewind-stop signal producing part 101, the output of which in turn generates a signal of L level which is supplied to the AND gate 107 and to the transistor 110 through the OR gate 109. As a result, the transistor 110 is turned off to de-energize the motor M. In other words, the motor M is de-energized at the time when the leader of the film F has passed the distal end of the sensing pin 46. However, the film F will further be rewound by the motor M under inertia. As described hereinbefore, the distal end of the sensing pin 46 is so arranged to sense the passage of the film leader portion at a position spaced away from the inlet slit P2 of the cartridge P by a distance larger than the length of the film which is fed by the de-energized motor M under inertia. Even though the film F it further rewound under inertia after the motor M has been de-energized, accordingly, the rotation of the motor M can completely be stopped with some part of the leader of the film F remaining outside of the cartridge P.

If it is desired that the rewinding is automatically stopped after the entire film F has completely be rewound into the cartridge P, the selector 48 is simply shifted from the position shown in FIG. 1 to the position N after the release button 13a has been depressed. This causes the cam 48a to close the switch 47. Under such a condition, the rewind lever 26 is rotated counter-clockwise from the position shown in FIG. 1. As a result, the rotation of the motor M can be transmitted to the cartridge hub P1 to initiate a rewind of the film F into the cartridge P.

When the rewinding operation proceeds until the leader of the film P has passed the distal end of the sensing pin 46, this distal end penetrates into the aperture 2a in the pressure plate 2 under the biasing force of the contact piece 45a in the same manner as described hereinbefore. As a result, the contact piece 45a separates from the contact piece 45b to open the film sensing switch 45. Since at this time the switch 47 is in its ON state, the input signal received by the AND gate 107 remains L level. At this point of time, the capacitor 103 initiates being charged with current through the pull-up resistor 102. After passage of a period of time from the opening of the film sensing switch 45, which is defined by a time constant based on the values of the pull-up resistor 102 and capacitor 103, the input signal received by the AND gate 107 is changed from H level to L level. As described hereinbefore, thus, the output of the OR gate 109 generates a signal of L level used to de-energize the motor M. However, the film F is further rewound by the de-energized motor M under inertia. Said time constant is established such that a rewind-stop signal of L level will be supplied from the invertor 104 to the AND gate 107 when the length of the film F from the inlet slit P2 of the cartridge P to the outermost end of the film leader becomes smaller than that of the film F further fed by the de-energized motor M under inertia. Consequently, the motor M is completely stopped after the film F has completely been rewound into the cartridge P.

The second embodiment of the present invention will now be described with reference to FIG. 3.

The second embodiment is different from the first embodiment only with respect to the rewind-stop signal producing part 101. More particularly, a rewind-stop signal producing part 101 in the second embodiment includes a counter circuit for establishing a time delay (when the selector 48 is shifted to the position N) from the time the switch 45 is opened to the time when the AND gate 107 receives a rewind-stop signal of L level to de-energize the motor M, in place of said CR time constant circuit (102, 103).

Figure 3:
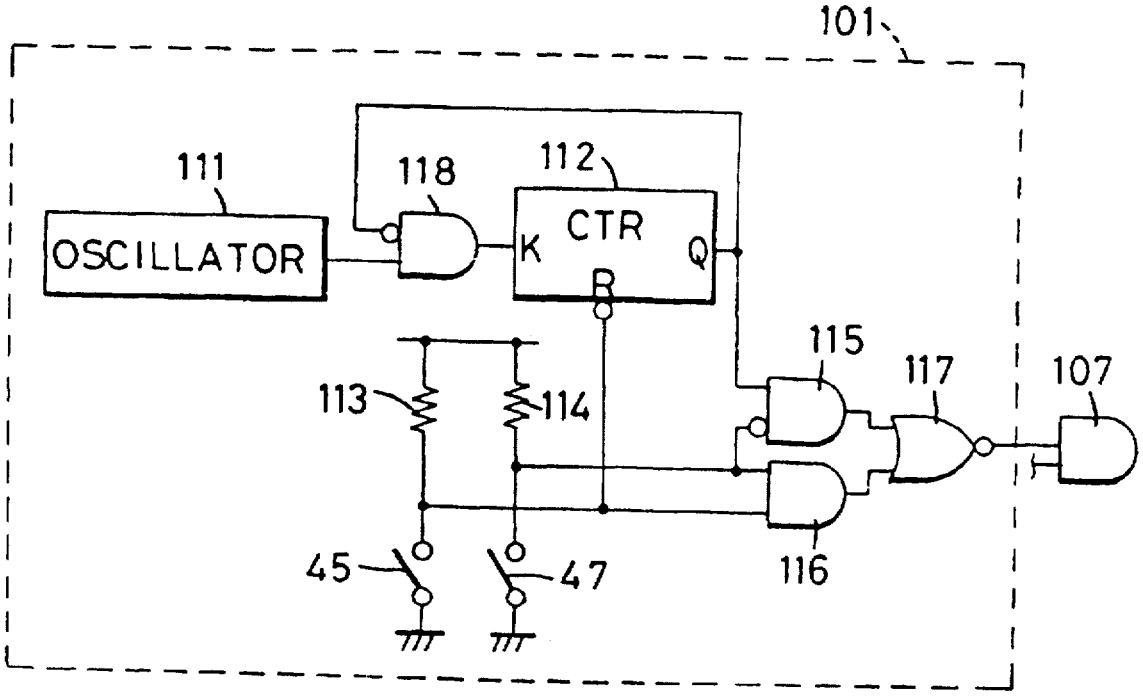
FIG. 3 is an electric circuit diagram of another arrangement constructed according to a second embodiment of the present invention.

As seen from FIG. 3, the film sensing switch 45 is coupled with a pull-up resistor 113 while the switch 47 is connected with a pull-up resistor 114. A junction between the film sensing switch 45 and the pull-up resistor 113 is connected with an input terminal of an AND gate 116 while a junction between the switch 47 and the pull-up resistor 114 is coupled with the inverted input terminal of an AND gate 115 and with another input terminal of the AND gate 116, respectively.

The output terminals of the AND gates 115 and 116 are coupled with the input terminal of a NOR gate 117 the output terminal of which in turn is connected with the input terminal of the AND gate 107.

The circuit also comprises an oscillator 111 for providing clock pulses to the input terminal K of a counter 112 through an AND gate 118. The input terminal K of the counter 112 is connected with the output terminal of the AND gate 118 with the output terminal Q thereof being coupled with the inverted input terminal of the AND gate 118 and the input terminal of the AND gate 115, respectively. The counter 112 further includes a reset terminal R coupled with a junction between the film sensing switch 45 and the pull-up resistor 113.

When the number n of clock pulses is counted by the counter 112, the output signal at the output terminal Q of the counter 112 is changed from L level to H level. Subsequently, the output of the counter 112 is held at H level.

The second embodiment of the present invention is operated in the following manner:

(1) When the selector 48 is shifted to the position N, the switch 47 is turned on. As a result, the potential at the junction between the switch 47 and the pull-up resistor 114 becomes L level. This signal of L level is applied to the input terminal of the AND gate 116 and the inverted input terminal of the AND gate 115. Thus, the output of the AND gate 116 becomes L level while the, AND gate 115 is opened. Then, the film sensing switch 45 is turned on by the release button 13a depressed for rewinding. Therefore, the potential at the junction between the film sensing switch 45 and the pull-up resistor 113 becomes L level. This signal of L level is supplied to the reset terminal R of the counter 112 to reset the same. The output terminal Q generates a signal of L level which in turn is supplied to the inverted input terminal of the AND gate 118 to open it. This causes clock pulses from the oscillator 111 to be provided to the input terminal K of the counter 112 through the AND gate 118. However, counting is not initiated since the counter 112 is in its reset state. Furthermore, the output of the AND gate 115 also becomes L level since the signal of L level has been supplied from the output terminals Q to the input terminal of the AND gate 115. At the same time, a signal of L level has been produced from the AND gate 116. Therefore, a signal of H level is applied from the NOR gate 117 to the AND gate 107 to energize the motor M as in the first embodiment. As a result, rewinding is initiated. When the rewinding proceeds until the leader portion of the film F has passed the distal end of the sensing pin 45, the film sensing switch 45 is turned off. This causes the potential at the junction between the film sensing switch 45 and the pull-up resistor 113 to change from L level to H level. The signal of H level is applied to the reset terminal R of the counter 112. As a result, the counter 112 is released from the reset state and then initiates counting clock pulses from the oscillator 111. When a predetermined number n of clock pulses are counted by the counter 112, the output terminal Q is changed from L level to H level. A signal of H level is then supplied to the AND gate 118 to close the same. Accordingly, no more clock pulses will be applied from the oscillator 111 to the input terminal K of the counter 112. As a result, the output terminal Q of the counter 112 will be held at H level. The signal of H level is then applied to the AND gate 115 such that two inputs of the AND gate 115 will be at H level (one inverted) and the signal from the AND gate 115 will be changed from L level to H level. Further, the signal from the NOR gate 117 will be changed from H level to L level. Consequently, the motor M is de-energized.

(2) When the selector 48 is shifted to the position T, the switch 47 is turned off to change the potential at the junction between the switch 47 and the pull-up resistor 114 to H level. The signal of H level is applied to the input terminal of the AND gate 116 and the inverted input terminal of the AND gate 115. As a result, and AND gate 116 is opened, and the output of the AND gate 115 is changed to L level independently of the signal from the counter 112. The potential at the junction between the film sensing switch 45 and the pull-up resistor 113 becomes L level since the film sensing switch 45 is turned on when the release button 13a is depressed to initiate a rewinding. As the rewinding proceeds until the leader portion of the film F has passed the distal end of the sensing pin 45, the film sensing switch 45 is turned off. Accordingly, the potential at the junction between the film sensing switch 45 and the pull-up resistor 113 is changed from L level to H level. As a result, the signal from the NOR gate 117 is changed from H level to L level to de-energize the motor M.

In the second embodiment, the aforementioned time delay from the time when the film sensing switch 45 is turned off to the time when the motor M is de-energized is determined by the time interval t of clock pulses multiplied by said predetermined number n of clock pulses. This time delay corresponds to a constant time defined by the values of the resistor and capacitor 102, 103 in the first embodiment.

The first embodiment provides a simple time constant circuit including means for delaying said film sensing signal which comprises the pull-up resistor 102, capacitor 103 and other parts. The second embodiment provides a simple counter circuit including means for delaying said film sensing signal which comprises the oscillator 111, the counter 112 and other parts. Neither of the first nor second embodiment requires any special switch means for sensing the film leader portion completely rewound into the cartridge in addition to the film sensing switch 45. The necessary space can be reduced with reduced cost of manufacturing. Particularly, if a shutter controlling timer or the like in the camera is utilized as a time constant circuit, the number of parts can be decreased.

The third embodiment of the present invention will now be described with reference to FIGS. 4 and 5.

The third embodiment is different from the second embodiment only with respect to parts associated with the rewind-stop signal producing part 101. More particularly, the oscillator 111 is replaced by rotation detecting means for generating output pulse signals depending on the angle of rotation of the motor M. Pulse signals from the rotation detecting means can be counted by said counter 112. The description of the remaining parts will be omitted since they are similar to the parts shown in FIGS. 1 and 2.

Figure 4:
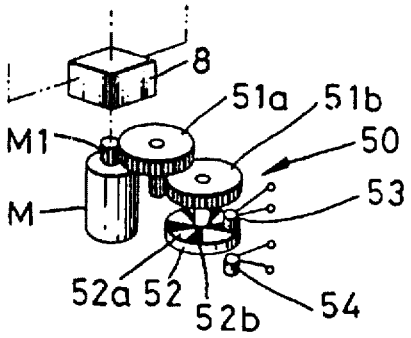
FIG. 4 is a perspective view of the internal detailed arrangement of a camera according to a third embodiment of the present invention.
Figure 5:
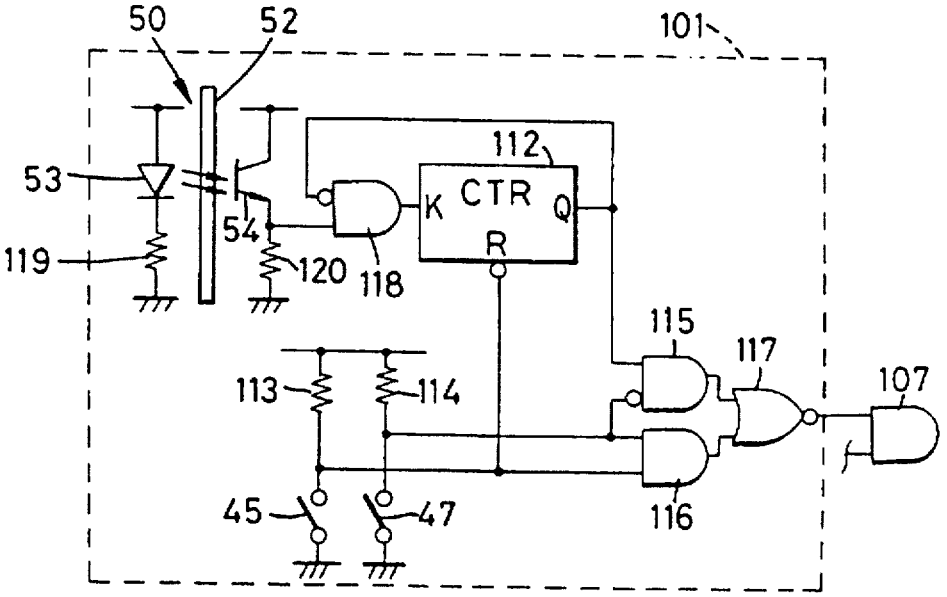
FIG. 5 is an electric circuit diagram of the arrangement shown in FIG. 4.

As shown in FIGS. 4 and 5, the rotation detecting means 50 comprises an interlock gear 51a engaging an output gear M1 in the motor M, another interlock gear 51b engaging the gear 51a, a disc 52 rotatable with the gear 51b, a light emitting part 53, a light receiving part 54, a resistor 119 connected with the light emitting part 53 and a resistor 120 coupled with the light receiving part 54.

The disc 52 includes transparent and opaque patterns 52a, 52b which are radially and alternately arranged thereon. The disc 52 functions to chap a beam of light emitted from the light emitting part 53 toward the light receiving part 54. At least when the motor M is being rotated, the light emitting part 53 is being energized with current defined by the resistor 119.

A junction between the light receiving part 54 and the resistor 120 is coupled with the input terminal of the AND gate 118. When the light receiving part 54 receives the beam of light chopped by the disc 52 and thus the opaque patterns 52b, the light receiving part 54 is turned on. When the beam of light is blocked by any one of the opaque patterns 52b, the light receiving part 54 is turned off. Pulse signals are thus generated at the junction between the light receiving part 54 and the resistor 120 and then supplied to the input terminal of the AND gate 118.

The operation of the third embodiment is as follows:

Assume that the selector 48 is shifted to the position N (closing switch 47) to initiate a rewinding operation, and that the film sensing switch 45 is turned off, as in the second embodiment. The counter 112 is then released from its reset state and initiates counting pulse signals fed from the junction between the light receiving part 54 and the resistor 120 through the AND gate 118. When a predetermined number of pulse signals are counted by the counter 112, the output terminal Q thereof is changed from L level to H level. The output signal of H level is supplied to the AND gate 118 to close the same. As a result, no pulse signal is applied from the rotation detecting means 50 to the input terminal K of the counter 112. Therefore, the output terminal Q of the counter 112 is held at H level. The output signal of H level is supplied from the output terminal Q to the AND gate 115 such that both the two inputs therein (one inverted) become H level. Thus, the AND gate 115 generates an output signal of H level while the NOR gate 117 produces an output signal of L level. In such a manner, the motor M will be de-energized.

In the third embodiment, the time delay from the time when the film sensing switch 45 is turned off to the time when the motor M is actually de-energized is defined by the time interval t of pulse signals multiplied by the number n of the pulse signals, as in the second embodiment.

According to the third embodiment, the rotation detecting means 50 generates the number of pulse signals corresponding to the angle of rotation in the motor M, and the counter 112 detects that a predetermined number of pulse signals n are produced after the film sensing switch 45 has been turned off. Even if a period of time required to rewind the film is variable due to variations of source voltage or different kinds of cartridges, therefore, the leader portion of the film F can completely be rewound into the cartridge P.

With a camera including means for detecting the angle of rotation of a motor to feed a film by a constant amount on winding-up, or with a camera including used rotation detecting means used to monitor the motor with respect to its speed to change the speed of the fed film, the rotation detecting means can also be used to perform the same function as in the aforementioned rotation detecting means 50. Thus, the space required for the rotation detecting means 50 can be omitted, with reduced cost of manufacturing.

Although the angle of rotation of the motor M is detected directly by the rotation detecting means 50 in the third embodiment of the present invention, such angle of rotation in the motor M may be detected at any point on the film rewind mechanism 6 along the path from the first gear 31 to the fork-shaped portion 35.

The rotation detecting means 50 may be of a magnetic type rather than a photoelectric type as in the third embodiment.

The fourth embodiment of the present invention will now be described with reference to FIGS. 6 and 7.

The fourth embodiment is designed such that the manipulated portion of the selector for actuating the switch 47 is miniaturized in place of the selector 48 in the first and second embodiments and that this manipulated portion can be observed externally only when the back lid 9 is opened.

Figure 6:
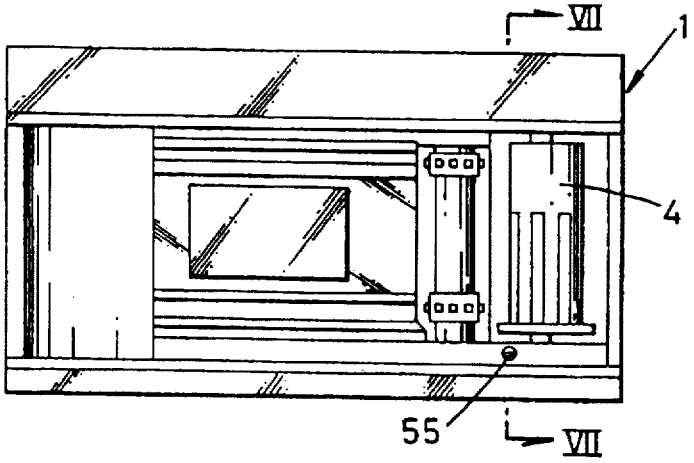
FIG. 6 is a plan view illustrating a fourth embodiment of the present invention.
Figure 7:
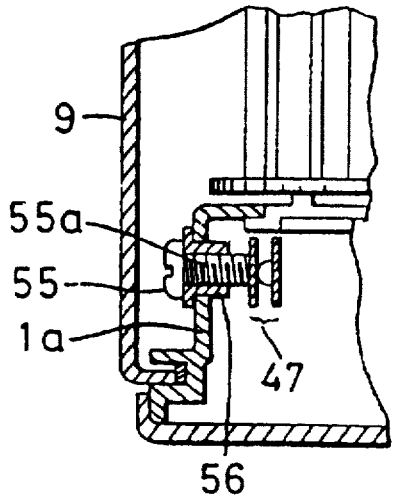
FIG. 7 is a cross-sectional view taken along line VII—VII in FIG. 6.

As shown in FIGS. 6 and 7, a screw 55 is provided below the spool 4 as a manipulated portion and threadingly engaged into a bushing 56 secured to the body 1a of the camera 1. The inner end 55a of the screw 55 is engageable with one of the contact pieces in the switch 47.

In such an arrangement, when the screw 55 is moved into the bushing 56 as shown in FIG. 7, the inner end 55a thereof presses the contact piece in the switch 47 to close the same. If the screw 55 is loosened and moved outwardly from the position shown in FIG. 7, the inner end 55a thereof is separated from the contact piece of the switch 47 to open the same.

In the fourth embodiment, the manipulated portion of the selector which will not frequently be manipulated is miniaturized and disposed on the inner side of the back lid 9. The aesthetic appearance of the camera can be improved and also the other manipulated parts cannot adversely be affected in space or operation.

The screw 55 may be replaced by two pins having different lengths by one of which one of the contact pieces in the switch 47 is urged to close.

The fifth embodiment of the present invention will now be described with reference to FIGS. 8, 9 and 10.

The fifth embodiment includes a second film sensing switch 60 the output of which generates a first half rewind-stop signal when the second film sensing switch 60 is shifted from its ON state to its OFF state and if the selector 48 is in the position N. In the fifth embodiment, the film wind-up mechanism, film rewind mechanism, rewind actuating portion, clutch mechanism, lid opening and closing mechanism and locking mechanism are respectively similar to parts designated 5, 6, 7, 8, 10 and 11 in FIG. 1. Circuits other than a rewind-stop signal producing part 101 also are similar to those shown in FIG. 2. Therefore, these parts and circuits will not be illustrated in FIGS. 8 and 9.

The second film sensing switch 60 is rigidly mounted at its base on a switch lever 61 and includes one of two contact pieces 60a rigidly supporting at its lower end a sensing pin 62.

Figure 8:
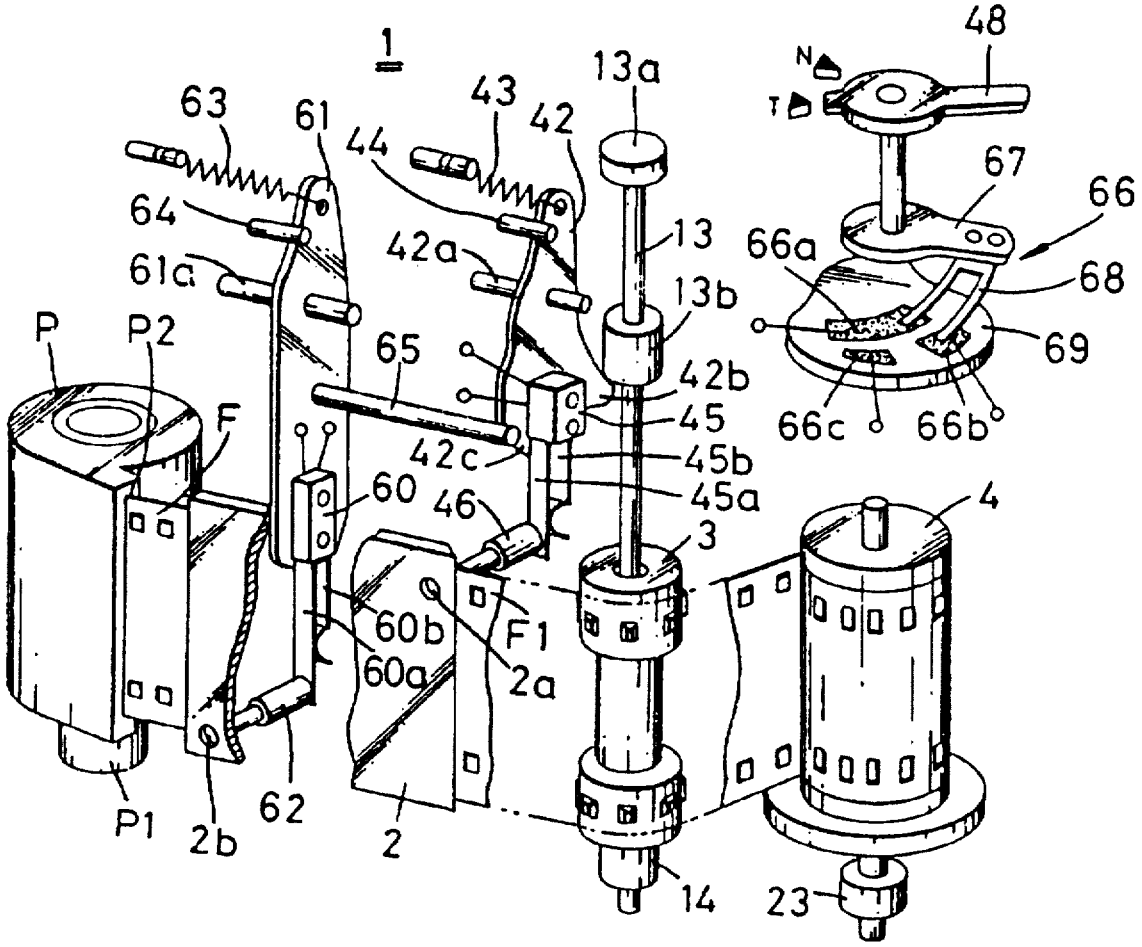
FIG. 8 is a perspective view of the internal detailed arrangement of a camera according to a fifth embodiment of the present invention.

The switch lever 61 is rotatably supported by a shaft 61a, biased counter-clockwise under the action of a spring member 63 and held at its home position shown in FIG. 8 by means of a stop 64. The switch lever 61 also includes an engagement pin 65 which is adapted to engage the lower end 42c of said switch lever 42 and transmit the clockwise rotation of the lever 42 to the switch lever 61.

When the switch lever 61 is rotated clockwise from its illustrated position, the distal end of the sensing pin 62 engages the lower edge F2 of the film F. If the leader portion of the film F has passed the distal end of the sensing pin 62, this distal end can penetrate into an aperture 2b in the pressure plate 2 under its own biasing force. Two contact pieces 60a and 60b in the second film sensing switch 60 are separated from each other in the illustrated position and contacted with each other when the distal end of the sensing pin 62 is in engagement with the film F.

As described with respect to the first embodiment, the sensing pin 46 and aperture 2a are spaced from the inlet slit P2 of the cartridge P by a distance larger than the length of the film F that is fed by the de-energized motor M under inertia.

Figure 10:
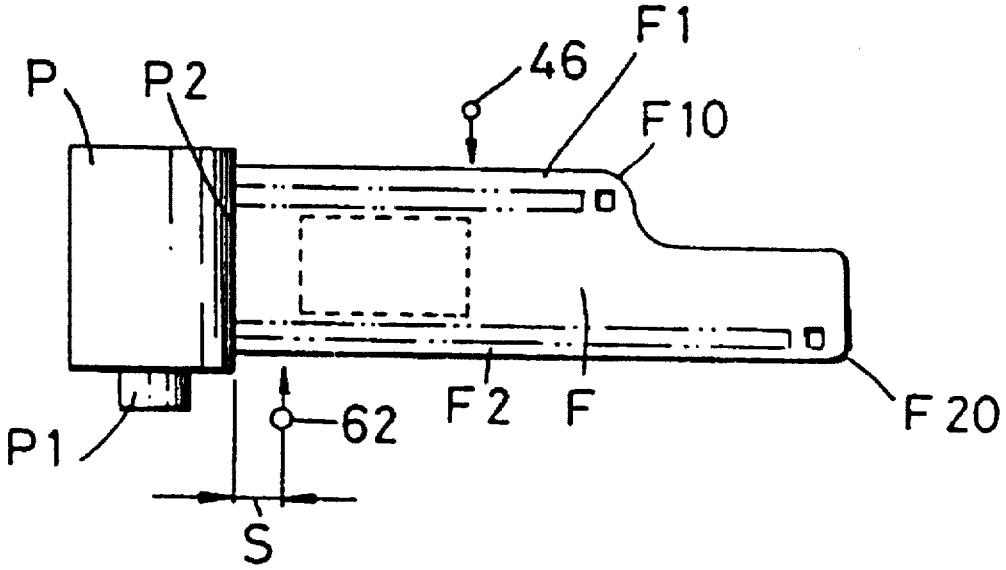
FIG. 10 illustrates the relationship between a film and operating parts in the system.

As shown in FIG. 10, the sensing pin 62 and aperture 2b are spaced from the inlet slit P2 of the cartridge P by a distance S smaller than the length of the film F which is fed by the de-energized motor M under inertia.

Figure 9:
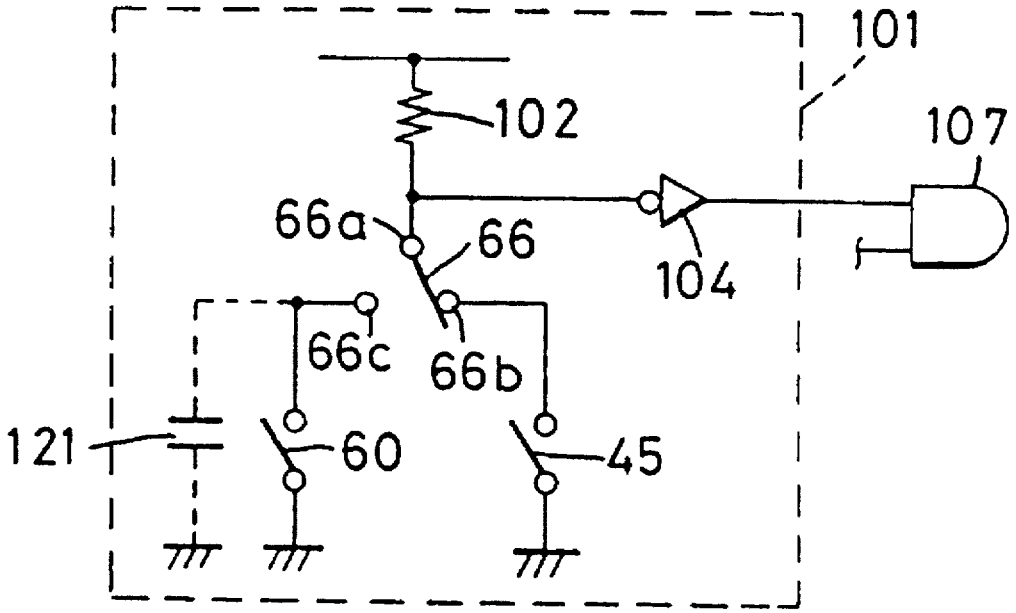
FIG. 9 is an electric circuit diagram of the arrangement shown in FIG. 8.

In the fifth embodiment, a selector switch 66 operatively associated with the selector 48 is used in place of said switch 47, as seen from FIGS. 8 and 9. The selector switch 66 comprises an insulating plate 67 rotatable with the selector 48, a conductive brush 68 rigidly mounted on the insulating plate 67 and a switch base plate 69 rigidly attached to the camera 1. The switch base plate 69 is formed with conductive patterns 66a, 66b and 66c. When the selector 48 is shifted to the position T, the conductive patterns 66a and 66b are short-circuited with each other through the brush 68. On the other hand, the conductive patterns 66a and 66c are short-circuited with each other when the selector 48 is shifted to the position N.

The conductive pattern i 66a, 66b and 66c are coupled with the pull-up resistor 102, the first film sensing switch 45 and the second film sensing switch 60, respectively.

When the selector 48 is shifted to the position T, the conductive patterns 66a and 66b on the selector switch 66 are short-circuited with each other to connect the first film sensing switch 45 with the pull-up resistor 102 through the selector switch 66. When a rewinding operation is initiated under such a condition and if the termination F10 of the upper edge F1 of the film leader portion passes the distal end of the sensing pin 46 to open the first film sensing switch 45, a rewind-stop signal of L level is supplied from the invertor 104 to the AND gate 107. Thus, the motor M is de-energized.

When the selector 48 is shifted to the position N, the conductive patterns 66b and 66c on the selector switch 66 are short-circuited with each other to connect the second film sensing switch 60 with the pull-up resistor 102 through the selector switch 66. When the rewinding operation is initiated under such a condition and if the termination F20 of the lower edge F2 of the film leader portion passes the sensing pin 60, the distal end of the second film sensing switch 60 then penetrates into the aperture 2b in the pressure plate 2 under the biasing force of the contact piece 60a which in turn is separated away from the other contact piece 60b to open the second film sensing switch 60. Thus, a rewind-stop signal of L level is supplied from the invertor 104 to the AND gate 107 to de-energize the motor M. At this time, the termination F20 of the lower film edge F2 is in a position spaced apart from the inlet slit P2 of the cartridge P by the aforementioned distance S. Even when the motor M is de-energized, therefore, the film F can further be rewound by the de-energized motor M under inertia, so that the film F will completely be rewound into the cartridge P and subsequently the motor M will completely be stopped.

If the length of the film fed by the de-energized motor M under inertia is very small, the second film sensing switch 60 may be connected in parallel with a capacitor 121, as shown by broke in line in FIG. 9. Thus, the capacitor 121 and pull-up resistor 102 define a time constant circuit for providing a time delay from the time when the second film sensing switch 60 is turned off to the time when a rewind-stop signal of L level is actually supplied to the AND gate 107 through the invertor 104. In such a manner, all the leader portion of the film F can completely be rewound into the cartridge P.

According to the fifth embodiment, the circuitry of the rewind-stop signal producing part 101 is very simplified since two different film sensing switches are respectively located at different positions and changed from one to another by means of the selector switch 66.

The sixth embodiment of the present invention will next be described with reference to FIGS. 11 through 14.

In the sixth embodiment, the back lid 9 includes a first film sensing switch 71, a second film sensing switch 72, a selector switch 70 and a selector 73, all of which are mounted on the back lid 9. Film wind-up mechanism, film rewind mechanism, rewind actuating portion, clutch mechanism, lid opening and closing mechanism and locking mechanism are similar to those shown in FIG. 1 and thus omitted in FIG. 11.

Figure 11:
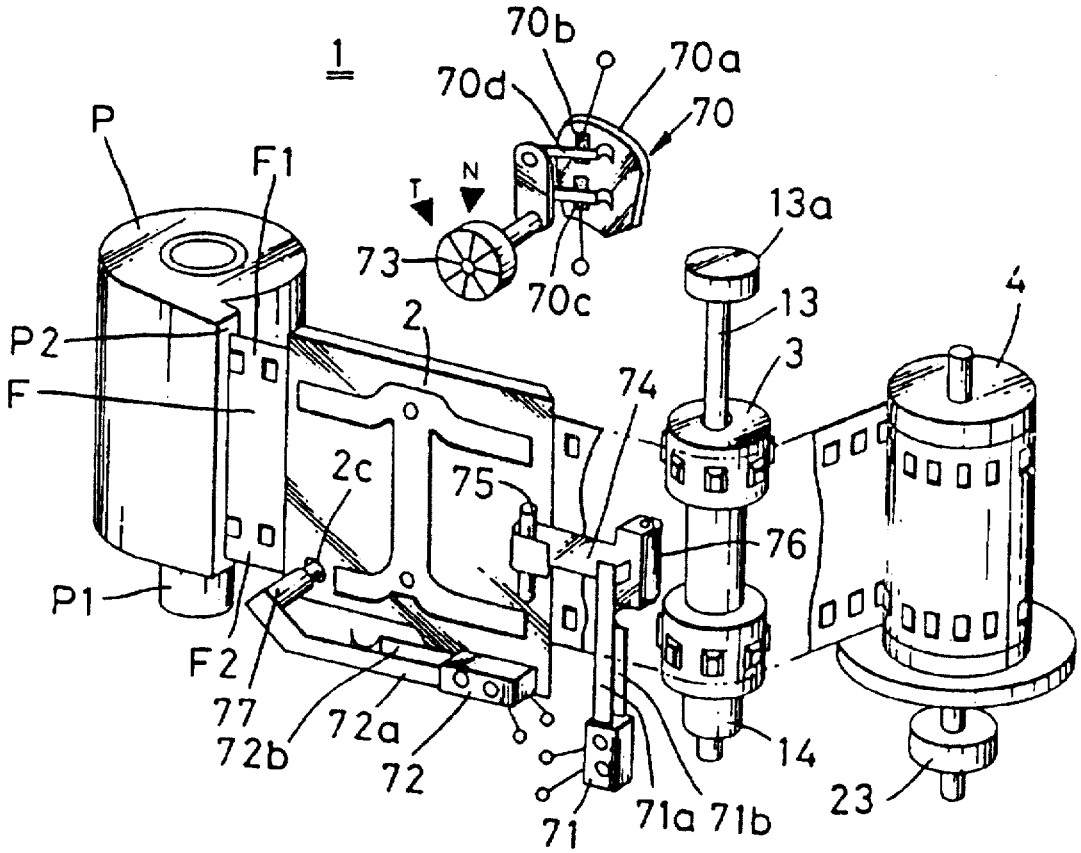
FIG. 11 is a perspective view of the internal detailed arrangement of a camera according to a sixth embodiment of the present invention.

As seen from FIG. 11, the first film sensing switch 71 is rigidly mounted at its base on the back lid 9 and includes a contact piece 71a engaging an arm 74 which is rotatably supported by a shaft 75 on the back lid 9 and carries a roller 76. When the roller 76 is in engagement with the film F, the contact piece 71a is in a position spaced away from another contact piece 71b in the first film sensing switch 71 to open the same. After the leader portion of the film F passes the roller 76, the arm 74 is rotated counter-clockwise about the shaft 75 under the biasing force of the contact piece 71a. As a result, this contact piece 71a will contact the other contact piece 71b to close the first film sensing switch 71.

The second film sensing switch 72 is rigidly mounted at its base on the pressure plate 2 and includes a contact piece 72a the distal end of which rigidly supports a sensing pin 77. The distal end of the sensing pin 77 extends through the aperture 2c in the pressure plate 2 and is resiliently urged toward and engaged by the lower edge F2 of the film F under the biasing force of the contact piece 72a. During engagement of the distal end of the sensing pin 77 with the lower film edge, F2, the contact piece 72a is held spaced away from another contact piece 72b to open the second film sensing switch 72. As the termination of the lower edge F2 of the film leader portion passes the sensing pin 77, the contact piece 72a is brought into contact with the other contact piece 72b to close the second film sensing switch 72.

The selector 73 is supported on the back lid 9 to be shiftable between the positions T and N.

The selector switch 70 comprises a base plate 70a rigidly mounted on the back lid 9, two conductive portions 70b, 70c and a conductive brush 70d shiftable with the selector 73. When the selector 73 is shifted to the position N as shown, two distal ends of the conductive brush 70d are respectively located on the outer insulating portions of the conductive portions 70b and 70c so that the selector switch 70 is in its OFF state. When the selector 73 is shifted to the position T, the distal ends of the conductive brush 70d are respectively placed on the conductive portions 70b and 70c to short-circuit them. As a result, the selector switch 70 is turned on.

Figure 12:
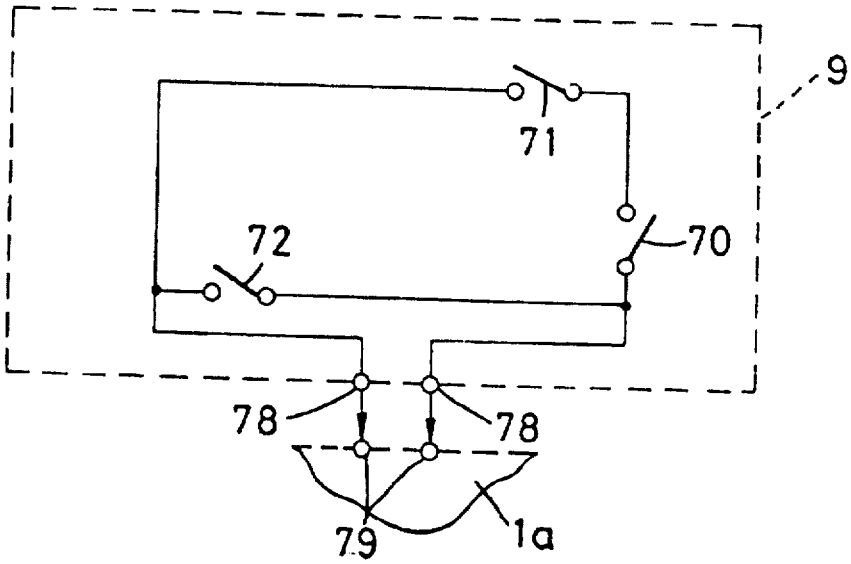
FIGS. 12 to 14 are electric circuit diagrams of the arrangement shown in FIG. 11.
Figure 13:
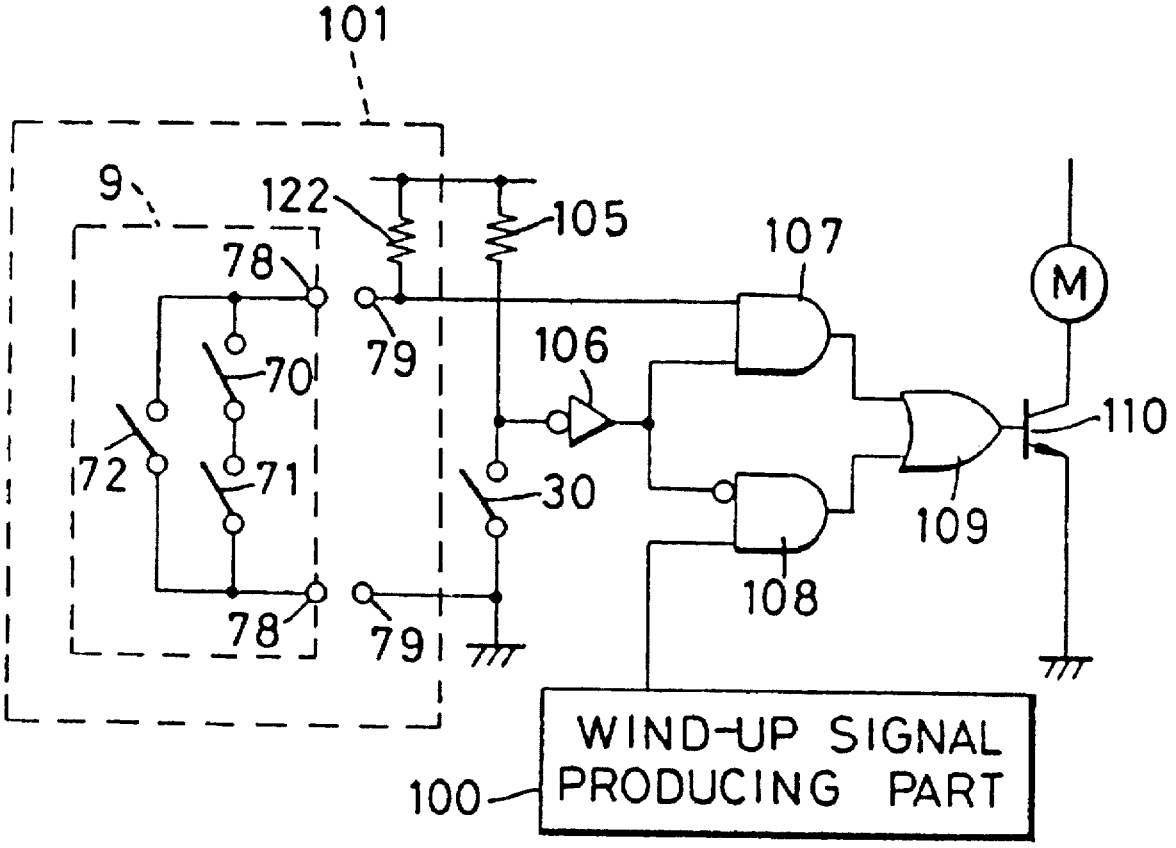

As shown in FIGS. 12 and 13, the selector switch 70 is connected in series with the first film sensing switch 71 while the second film sensing switch 72 is coupled in parallel with the series circuit defined by the selector switch 70 and first film sensing switch 71. The terminals of the second film sensing switch 72 are respectively connected with connecting terminals 78 which are capable of contacting terminals 79 on the body 1a of the camera 1 when the back lid 9 is closed. One of the terminals 79 is coupled with the pull-up resistor 122 to form a junction which in turn is connected with one of the input terminals in the AND gate 107. The other terminal 79 is connected with the rewind switch 30.

The roller 76 and sensing pin 77 are respectively disposed the same manner as in the film sensing pins 46 and 62.

When the selector 73 is shifted to the position T, the conductive brush 70d causes the conductive portions 70b and 70c to short-circuit with each other to close the selector switch 70. When a rewind operation is initiated under such a condition, the first film sensing switch 71 is held at its OFF state until the leader portion of the film F has passed the roller 76. At this time, the first film sensing switch 71 is turned on to place the potential at the junction between the terminal 79 and the pull-up resistor 122 at L level. This rewind-stop signal of L level is then supplied to the AND gate 107 to de-energize the motor M.

Figure 14:
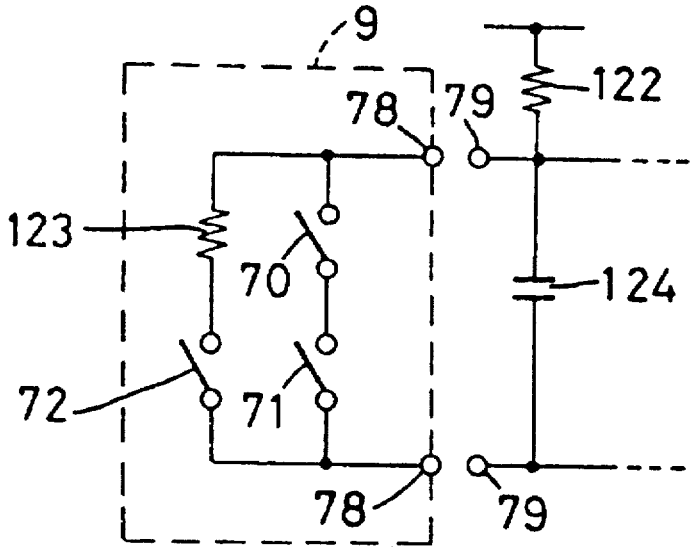

When the selector 73 is shifted to the position N, the conductive brush 70d is separated from the conductive portions 70b and 70c to open the selector switch 70. When a rewind operation is initiated under such a condition, the second film sensing switch 72 is placed in its OFF state until the leader portion of the film F has passed the sensing pin 77. At this time, the second film sensing switch 71 is turned on. As a result, the potential at the junction between the terminal 79 and the pull-up resistor 122 becomes L level. This rewind-stop signal of L level is applied to the AND gate 107 to de-energize the motor M.

Where the length of the film F fed by the de-energized motor M under inertia is very small, a capacitor 124 may be connected in parallel with the selector switch 70 and first film sensing switch 71 while at the same time a resistor 123 may be coupled between the connecting terminal 78 and the second film sensing switch 72, as shown in FIG. 14. Thus, the resistor 123 and capacitor 124 from a time constant circuit which can establish a time delay to the time when the second film sensing switch 72 is turned off from the time when a rewind-stop signal of L level is supplied to the AND gate 107. In such a manner, the leader portion of the film F can completely be rewound into the cartridge P.

According to the sixth embodiment, space in the body 1a of the camera 1 can be saved since the first and second film sensing switches 71, 72, the selector switch 70 and the selector 73 are mounted on the back lid 9 of the camera 1.

In the sixth embodiment, the back lid 9 may detachably be mounted on the body 1a of the camera 1. In such a case, the back lid 9 may be replaced by another back lid which does not include associated parts such as the switches 70, 71 and 72, the terminals 78 and other parts. When another back lid is mounted on the camera, the rewind operation will not be stopped automatically since the terminals 79 on the camera body will not be short-circuited under the various states of the film. The rewinding must manually be stopped.

It will be apparent from the foregoing that the camera embodied by the present invention can select one of two modes, that is, a mode in which a rewinding operation is automatically stopped with some part of the tongue of a film remaining outside of a cartridge and another mode in which the rewinding is automatically stopped after the entire film has completely been rewound into the cartridge.

We claim:

1. A device for rewinding a film drawn out from a film cartridge contained in a camera into said cartridge, said film having a leader portion at an end of the film, said device comprising:

an electric motor;

rewinding means driven by said motor for transporting said drawn-out film toward said cartridge;

means for detecting said leader portion of said film said film is transported by said rewinding means;

means responsive to said detecting means for generating a first output when said leader portion of said film [reached] *reaches* a position that is a predetermined distance from said cartridge;

means responsive to said detecting means for generating a second output when said leader portion of said film further approaches said cartridge from said predetermined distance;

means for selecting one of first and second conditions; and control means for deenergizing said motor in response to said first output when said first condition is selected by said selecting means and for deenergizing said motor in response to said second output when said second condition is selected by said selecting means, *wherein*

*said detecting means includes a pair of detectors disposed at different positions relative to each other in a transported direction of said film and adapted for sensing the passage of the end of said film, respectively, said first output generating means is responsive to one of said detectors, and said second output generating means is responsive to the other of said detectors,*

*said other detector includes a switch which, during transport of said film by said rewinder mechanism, is maintained in a first state until it changes to a second state in response to the passage of the end of said film;*

*said second output generating means includes timer means for counting a predetermined period of time in response to the change of state of said switch, and thereafter generates said second output.*

[2. A device according to claim 1, wherein said first output generating means is adapted to generate said first output in such a manner that said film leader portion of said film remains outside of said cartridge by a determined amount during said first condition and wherein said second output generating means is adapted to generate said second output in such a manner that said film leader portion of said film is transported into said cartridge completely during said second condition.]

[3. A device according to claim 1, wherein said first output generating means for adapted to generate said first output in such a manner that said film leader portion of said film remain outside of said cartridge by a determined amount when said film is further transported by said motor under inertia after said motor has been deenergized during said first condition and wherein said second output generating means adapted to generate said second output in such a manner that said film leader portion of said film is completely transported into said cartridge when said film is further transported by said motor under inertia after said motor has been deenergized during said second condition.]

[4. A device according to claim 1, wherein said detecting means includes a pair of detectors disposed at different positions relative to each other in a transported direction of said film and adapted for sensing the passage of the end of said film, respectively, said first output generating means is responsive to one of said detectors, and said second output generating means is responsive to the other of said detectors.]

[5. A device according to claim 1, wherein said second output generating means includes timer means for counting a predetermined period of time in response to said detecting means.]

6. A device [according to claim 5, wherein] *for rewinding a film drawn out from a film cartridge contained in a camera into said cartridge, said film having a leader portion at an end of the film, said device comprising:*

*an electric motor;*

*rewinding means driven by said motor for transporting said drawn-out film toward said cartridge;*

*means for detecting said leader portion of said film when said film is transported by said rewinding means;*

*means responsive to said detecting means for generating a first output when said leader portion of said film reaches a position that is a predetermined distance from said cartridge;*

*means responsive to said detecting means for generating a second output when said leader portion of said film further approaches said cartridge from said predetermined distance;*

*means for selecting one of first and second conditions; and*

*control means for deenergizing said motor in response to said first output when said first condition is selected by said selecting means and for deenergizing said motor in response to said second output when said second condition is selected by said selecting means, wherein*

*said detecting means includes a pair of detectors disposed at different positions relative to each other in a transported direction of said film and adapted for sensing the passage of the end of said film, respectively, said first output generating means is responsive to one of said detectors, and said second output generating means is responsive to the other of said detectors,*

*said second output generating means includes timer means for counting a predetermined period of time in response to said other detector, and thereafter generates said second output, and* said timer means includes means for adjusting said predetermined period of time in accordance with the rotation speed of said motor.

[7. A device according to claim 1, wherein said second output generating means includes timer means for counting a predetermined period of time after said first output has been generated and for causing said second output generating means to generate said second output after passage of said predetermined period of time.]

[8. A device for rewinding a film drawn out from a film cartridge contained in a camera into said cartridge, said film having a leader portion at an end of the film, said device comprising:

an electric motor;

first rewinding means driven by said motor for transporting said drawn-out film toward said cartridge until said leader portion of said film remains outside of said cartridge by a determined amount;

second rewinding means driven by said motor for transporting said drawn-out film toward said cartridge so that said leader portion of said film is transported into said cartridge completely; and means for changing between a first mode in which said film is rewound by said first rewinding means and a second mode in which said film is rewound by said second rewinding means.]

[9. A device according to claim 8, wherein said first rewinding means includes means for automatically stopping said motor when said leader portion of said film is transported to a predetermined distance from said cartridge.]

[10. A device according to claim 9, wherein said second rewinding means includes means for automatically stopping said motor when said leader portion of said film substantially enters said cartridge.]

*11. A device for rewinding a film drawn out from a film cartridge contained in a camera into said cartridge, said film having a leader portion at an end of the film, said device comprising:*

*an electric motor;*

*rewinding means driven by said motor for transporting said drawn-out film toward said cartridge;*

*means for detecting said leader portion of said film when said film is transported by said rewinding means;*

*means responsive to said detecting means for generating a first output when said leader portion of said film reaches a position that is a predetermined distance from said cartridge;*

*means responsive to said detecting means for generating a second output when said leader portion of said film further approaches said cartridge from said predetermined distance;*

*means for selecting one of first and second conditions; and*

*control means for deenergizing said motor in response to said first output when said first condition is selected by said selecting means and for deenergizing said motor in response to said second output when said second condition is selected by said selecting means,*

*wherein said second output generating means includes means for detecting rotation of said motor after said first output has been generated and means for causing said second output to be generated in response to detection of a predetermined rotation amount of said motor by said rotation detecting means.*

*12. A device according to claim 11, wherein said rotation detecting means generates a plurality of pulses per revolution of said motor and wherein said second output generating means generates said second output in response to generation of a predetermined number of pulses by said rotation detecting means.*

*13. A device according to claim 12, wherein said rotation detecting means includes means for generating light pulses with rotation of said motor and means for counting the light pulses.*

*14. A device according to claim 11, wherein the camera includes an operating member and said leader portion detecting means includes a film sensing member which is normally disengaged from said film as said film is drawn out from said film cartridge and which is displaceable into engagement with said film in response to operation of said operating member when said film is to be rewound into said film cartridge.*

*15. A device according to claim 14, wherein said film sensing member is mounted on a support which is pivotable in response to operation of said operating member to bring said sensing member into engagement with said film.*

*16. A device according to claim 14, wherein said film sensing member includes a pin adapted to move through an aligned opening of a pressure plate upon movement of an end of said film leader portion past said pin.*

*17. A device for rewinding a film drawn out from a film cartridge contained in a camera into said cartridge, said film having a leader portion at an end of the film, said device comprising:*

*an electric motor;*

*first rewinding means driven by said motor for transporting said drawn-out film toward said cartridge until said leader portion of said film remains outside of said cartridge by a determined amount;*

*second rewinding means driven by said motor for transporting said drawn-out film toward said cartridge so that said leader portion of said film is transported into said cartridge completely; and*

*means for changing between a first mode in which said film is rewound by said first rewinding means and a second mode in which said film is rewound by said second rewinding means,*

*wherein the camera has a back lid member which covers said film, and said changing means includes a change-over switch having an actuating member for switching said switch to change between said first and second modes, said actuating member being disposed at a position covered by said back lid member such that said back lid member precludes operation of said actuating member for switching said switch.*

*18. A device for rewinding a film drawn out from a film cartridge contained in a camera into said cartridge, said film having a leader portion at an end of the film, said device comprising:*

*an electric motor;*

*first rewinding means driven by said motor for transporting said drawn-out film toward said cartridge until said leader portion of said film remains outside of said cartridge by a determined amount;*

*second rewinding means driven by said motor for transporting said drawn-out film toward said cartridge so that said leader portion of said film is transported into said cartridge completely; and*

*means for changing between a first mode in which said film is rewound by said first rewinding means and a second mode in which said film is rewound by said second rewinding means,*

*wherein the camera has a lid member having an open position and a closed position, said changing means includes a change-over switch operable to change between said first and second modes when said lid member is at said open position and not operable to change between said first and second modes when said lid member is at said closed position.*

*19. A device for rewinding a film drawn out from a film cartridge contained in a camera into said cartridge, said film having a leader portion at an end of the film, said device comprising:*

*an electric motor;*

*rewinding means driven by said motor for transporting said drawn-out film toward said cartridge;*

*means for detecting said leader portion of said film when said film is transported by said rewinding means;*

*means responsive to said detecting means for generating a first output when said leader portion of said film reaches a position that is a predetermined distance from said cartridge;*

*means responsive to said detecting means for generating a second output when said leader portion of said film further approaches said cartridge from said predetermined distance;*

*means for selecting one of first and second conditions; and*

*control means for deenergizing said motor in response to said first output when said first condition is selected by said selecting means and for deenergizing said motor in response to said second output when said second condition is selected by said selecting means, wherein*

*said second output generating means includes timer means for counting a predetermined period of time in response to said detecting means,*

*the camera is provided with a film winding spool, said detecting means includes a detector which is disposed between said film cartridge and said film winding spool and which senses passage of an end of said film leader portion of said film, and*

*said detector includes sensing pin means disposed to engage a portion of said film during rewinding of said*

*film and adapted to move through an aligned opening of a pressure plate upon the passage of said end of said film leader portion of said film.*

*20. A device according to claim 19, wherein the camera has an operating member and wherein said sensing pin means is supported so as to be out of engagement with said film when said film is being drawn out from said film cartridge and so as to be displaceable into engagement with said film in response to operation of said operating member when said film is to be rewound into said film cartridge.*

*21. A device according to claim 20, wherein said sensing pin means is mounted on a support which is pivotable in response to operation of said operating member so as to bring said sensing pin means into engagement with said film.*

* * * * *